United States Patent [19]
Wanddell

[11] 3,840,930
[45] Oct. 15, 1974

[54] DOCKBOARD
[76] Inventor: Robert E. Wanddell, P.O. Box 4174, Charlotte, N.C. 28204
[22] Filed: Mar. 10, 1972
[21] Appl. No.: 233,508

[52] U.S. Cl. .................................................. 14/71
[51] Int. Cl. ............................................. B65q 11/00
[58] Field of Search .................................... 14/71, 72

[56] References Cited
UNITED STATES PATENTS

| | | | |
|---|---|---|---|
| 2,372,574 | 3/1945 | Haynes | 14/71 |
| 2,626,411 | 1/1953 | Palmer | 14/71 |
| 2,639,450 | 5/1953 | Ramer | 14/71 |
| 2,974,336 | 3/1961 | Kelley | 14/71 |
| 3,017,646 | 1/1962 | Kelley | 14/71 |
| 3,426,377 | 2/1969 | Beckwith | 14/71 |
| 3,440,673 | 4/1969 | Kelley | 14/71 |
| 3,596,303 | 8/1971 | Kelley | 14/71 |
| 3,636,578 | 1/1972 | Dieter | 14/71 |
| 3,665,538 | 5/1972 | Smith | 14/71 |

Primary Examiner—Nile C. Byers, Jr.
Attorney, Agent, or Firm—Richards, Shefte & Pinckney

[57] ABSTRACT

A dockboard having a dock plate that is supported flat on a dock top in an unobstructing disposition when in an inoperative position and can be raised to an operative position in which the outer end is elevated and the inner end remains supported on the dock top and slides horizontally there along during vertical movement of the outer end. Guide means is mounted on the vertical face of the dock and engages the outer end of the dock plate to guide it in substantially vertical movement while allowing pivoting to maintain the inner end on the dock top. A lip plate is hinged to the outer end of the dock plate and depends therefrom while being upwardly pivotable to a limited position at which the dock plate and lip plate engage to form a continuous load supporting span throughout their combined extent from a vehicle platform to the dock top.

7 Claims, 8 Drawing Figures

DOCKBOARD

BACKGROUND OF THE INVENTION

The present invention relates to a dockboard and more particularly to a dockboard for use on a loading dock to provide a ramp between the dock and the platform of an adjacent vehicle wherein no modification of the dock is required and guide means simply and easily controls manipulation.

Dockboards of various types are in common use at freight terminal docks and other places where vehicles are being unloaded. These dockboards range from no more than a simple plate laid across the space between a loading dock and a vehicle platform to complicated power-operated mechanisms mounted in recesses in docks and operated to extend outwardly and into position automatically onto a vehicle platform. The latter types are expensive, not only to construct, but also to install because a recess must be provided in the dock to accommodate the mechanism. It would, of course, be preferable that dockboards be designed so that no modification of the dock is necessary, but heretofore there have been tructural and operational limitations to such designs.

An early example of a dockboard mechanism that can be used without modifying the dock is disclosed in Eycleshimer U.S. Pat. No. 2,644,180, issued July 7, 1953, for Platform Ramp, which discloses a framework mounted beside a dock for vertical movement and to which two plates are pivoted for opposite extension to a vehicle platform and the dock top. The framework must be sturdily constructed, and therefore expensive, as it supports the load directly and through the pivot connections to the plates. Also, because it supports the load it must be capable of remaining in a set position and cannot inherently adjust to changes in vehicle platform levels that normally occur during loading and unloading operations.

Another example is disclosed in Kelley U.S. Pat. No. 3,017,646, issued Jan. 23, 1962, for Dockboard, which discloses a plate structure that is supported on the top of a dock and is raised and lowered through a mechanism mounted at the vertical face of the dock. This dockboard has an initial raised position and a significant plate structure thickness to accommodate a spring mechanism under the plate, which means it is an obstruction to the use of the dock when the dockboard is not in use. Also, the plate is hinged to a fixed ramp, which prevents it from sliding on the dock, and a fixed lip portion projects outwardly from the dock in an objectionable manner when the dockboard is not in use.

A recent example is disclosed in Kelley U.S. Pat. No. 3,596,303, issued Aug. 3, 1971, for Dockboard, which discloses a ramp pivoted centrally to a guide mechanism so that the ramp can be pivoted from a vertical inoperative position along the vertical face of a dock to a generally horizonal operative position at an elevated level. This construction has an objectionable limitation with regard to the range of height differences that can be accommodated because the ramp is restricted in length so that it can be disposed in a vertical position at the face of the dock without projecting above the dock top. This restriction is further limited because the usually shorter lip portion of the ramp must be made relatively long so as to cause the ramp to be unbalanced for pivoting automatically to a vertical position, thus leaving a relatively short length for the normally longer ramp portion.

The accommodation of large variations in comparative heights of vehicle platforms and docks, which is limited with these prior art dockboards is presently an important practical consideration due to the increasingly widespread containerized freight handling by ship and rail, which has required the trucking industry to adapt its equipment to handle the transportation of containers, often resulting in floor or platform heights substantially greater than that capable of being accommodated readily by existing dockboards.

In contrast to the prior art, the present invention provides a dockboard that is capable of accommodating a wide range of differences between vehicle platform and dock heights without requiring any special supporting or extension mechanism, that forms a continuous load supporting span from a vehicle platform to the dock top without requiring any intermediate supporting structure, that is mountable to a dock without requiring any recess or other dock modification and yet is disposed in an unobstructing position that permits free cross-traffic travel thereover when it is in its inoperative position, that is counterbalanced in an effective manner so that it can be easily manipulated manually, and that is simply and inexpensively constructed.

SUMMARY OF THE INVENTION

The dockboard of the present invention combines a dock plate, means for guiding vertical movement of the dock plate, and a lip plate hinged to the dock plate and cooperable therewith to form a continuous load supporting span between the top of a dock to which the dockboard is mounted and the platform of an adjacent vehicle.

The dock plate is flat and is disposed on the dock top with an outer end portion extending generally along an edge of the dock and an inner end portion supported freely on the dock top inwardly of the dock edge. The guide means is mounted on the vertical face of the dock below and pivotally connected to the dock plate outer end portion to guide movement thereof in a substantially vertical path above the dock top while allowing pivoting of the dock plate thereat so that the inner end portion of the dock plate will remain supported on and will slide along the dock top during vertical movement of the outer end portion. The lip plate hingedly depends from the dock plate outer end portion along a horizontal hinge axis for hinged pivoting therealong, with the pivoting being limited upwardly to cause the dock plate and lip plate to form a continuous load supporting span throughout their combined extent from a vehicle platform to the dock top.

As so constructed, the dockboard is movable from an inoperative position wherein the dock plate is flat on the dock top and the lip plate hangs vertically downward along the vertical face of the dock to an operative position at which the outer end portion of the dock plate has been raised vertically, the lip plate has been pivoted upwardly above the platform of an adjacent vehicle and the dockboard then lowered to dispose the lip plate on the vehicle platform with the lip plate pivoted upwardly to the limit of upward pivoting, whereby the lip plate and dock plate provide the aforesaid continuous load supporting span.

In the preferred embodiment of the present invention a hinge connection is provided between the guide means and dock plate with a pin secured to the guide means and extending coaxially with the aforesaid horizontal hinge axis. A plurality of hinge brackets are mounted on the pin for free pivoting thereon with alterante brackets secured to the dock plate and the other brackets secured to the lip plate, which plates are substantially equally offset radially from the hinge axis and have facing edges disposed for abutment to limit upward hinged pivoting and thereby effect the aforesaid continuous load supporting span.

To facilitate sliding of the inner end portion of the dock plate on the dock top, the preferred embodiment includes roller means mounted on the inner end portion substantially in the plate of the dock plate and in free rolling engagement with the dock top. This roller means includes a plurality of independent roller sections extending along the end of the inner end portion.

Also in the preferred embodiment the guide means includes a pair of vertically movable guide bars connected to the dock plate, with a horizontal cross-member extending between and connecting the guide bars. A horizontal shaft is mounted for rotation above and parallel to the cross-member and has a pair of pulleys mounted thereon for rotation therewith between and adjacent the guide bars. A line is trained over each pulley and has one end connected to the cross-member with a counterweight connected to the other end for counterbalancing the dock plate and guide means sufficiently to permit manual manipulation of the dock plate.

DESCRIPTION OF THE PREFERRED EMBODIMENT

Figure 1:
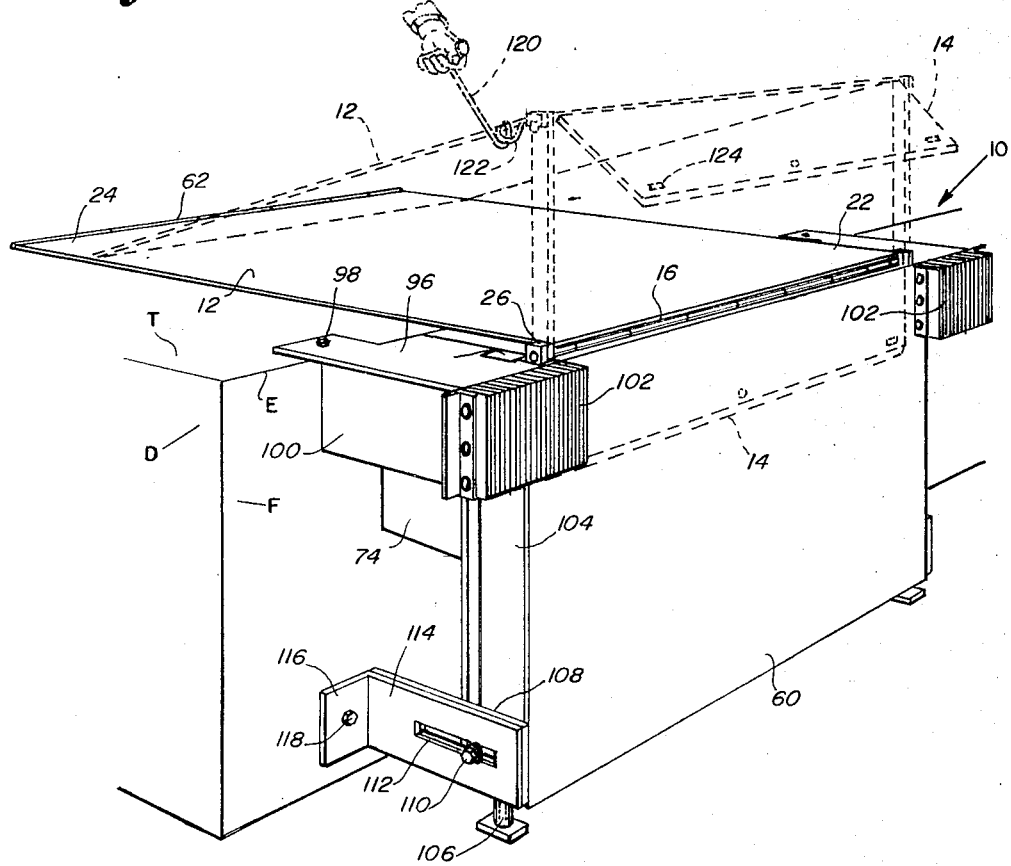
FIG. 1 is a perspective view of the preferred embodiment of the dockboard of the present invention shown mounted on a dock in its inoperative position, with a raised position shown in dash lines.
Figure 2:
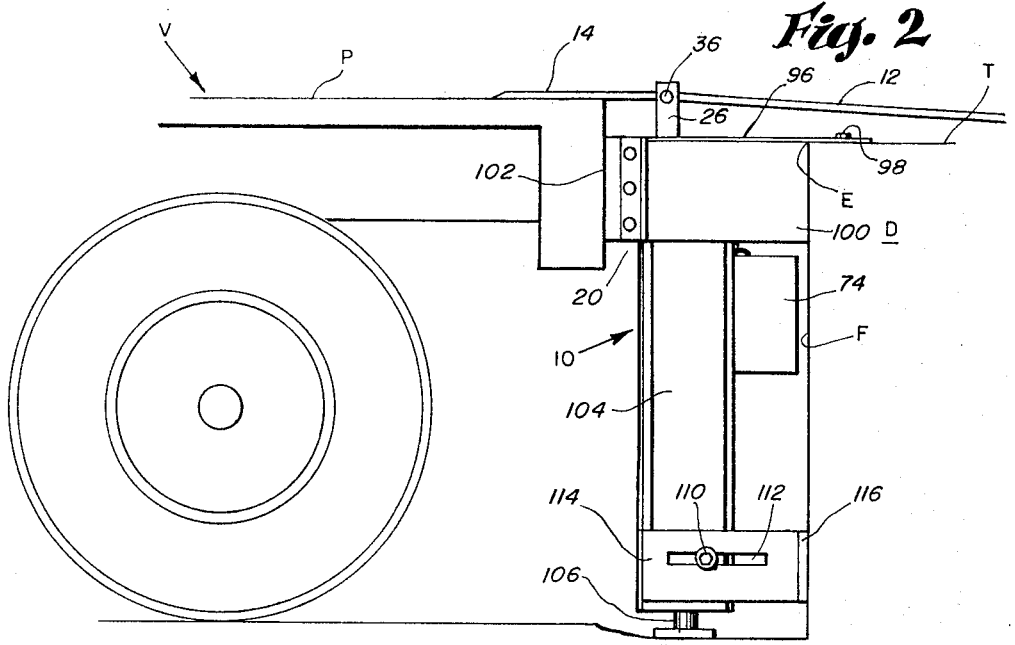
FIG. 2 is a side elevational view of the dockboard of FIG. 1 shows in its operative position extending between the dock top and the platform of an adjacent vehicle.
Figure 3:
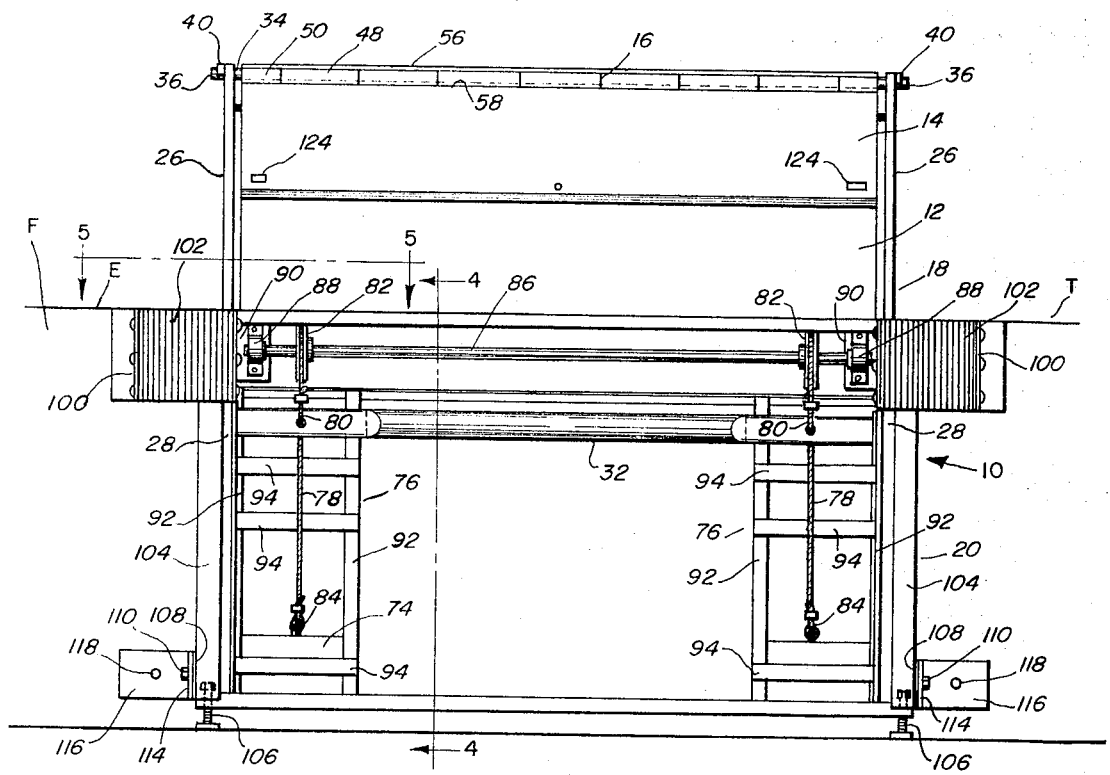
FIG. 3 is a front elevational view of the dockboard of FIG. 1 in a raised position and with the front cover panel removed.
Figure 4:
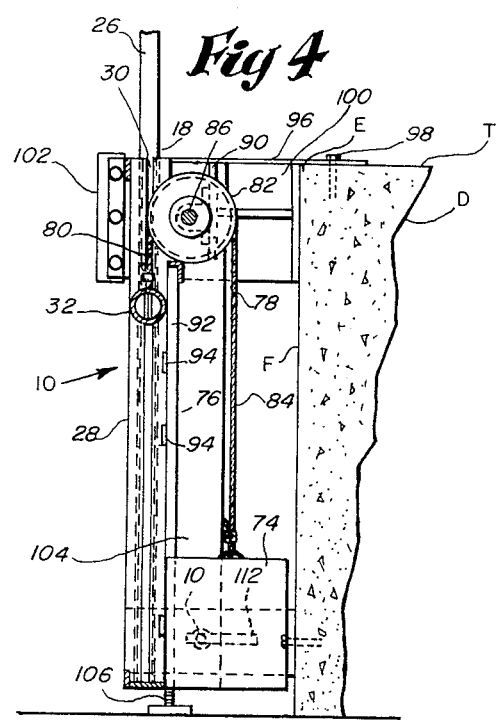
FIG. 4 is a vertical sectional view taken along line 4—4 of FIG. 3.
Figure 5:
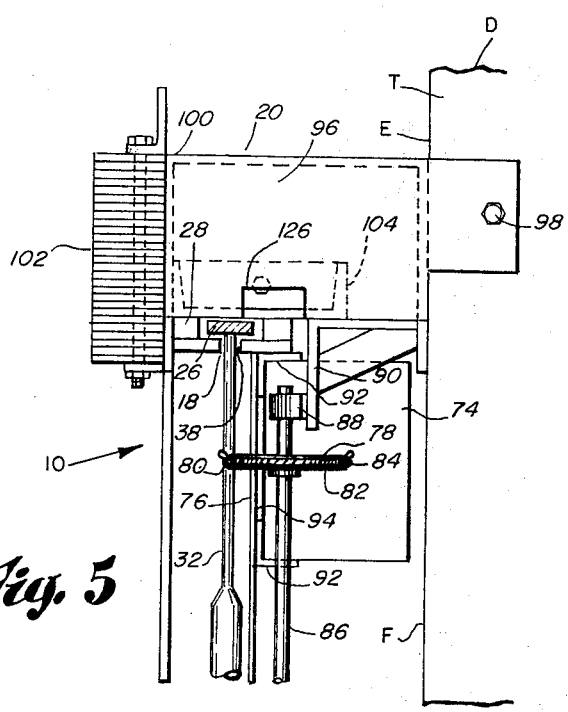
FIG. 5 is a horizontal sectional view taken along line 5—5 of FIG. 3.
Figure 6:
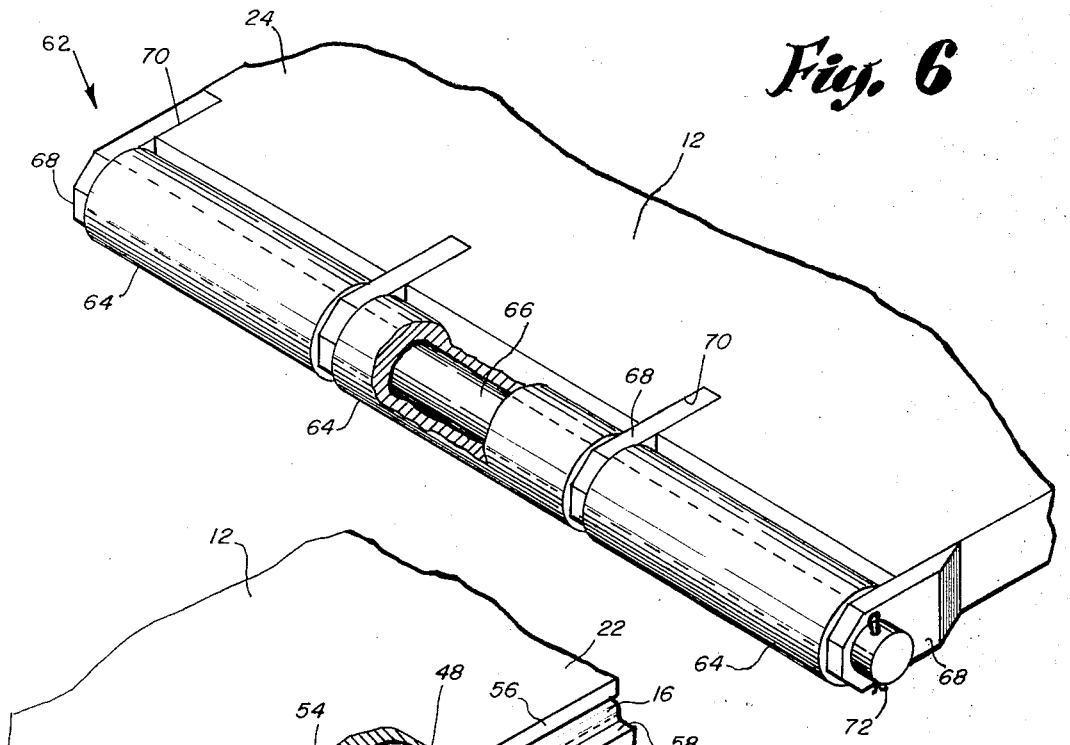
FIG. 6 is an enlarged perspective partial view of a portion of the roller means at the inner end portion of the dock plate of the dockboard of FIG. 1.
Figure 7:
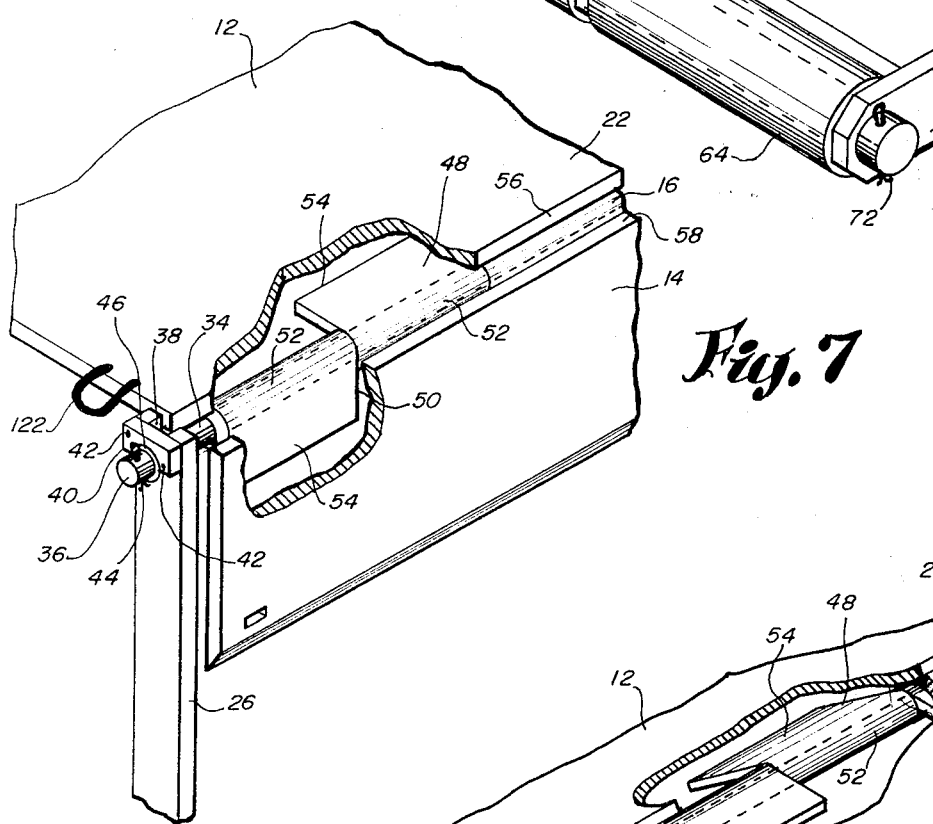
FIG. 7 is an enlarged perspective partial view, partially broken away, of the hinge connection of the dockboard of FIG. 1, showing the lip plate in hanging disposition.
Figure 8:
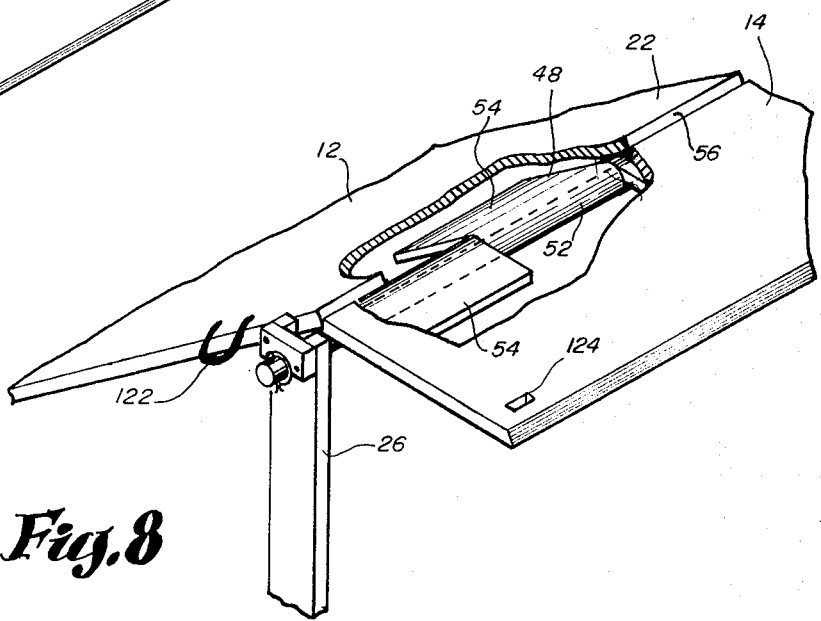
FIG. 8 is a view similar to FIG. 7, showing the lip plate pivoted upwardly to its limit in edge abutting relation to the dock plate outer end portion.

In the preferred embodiment illustrated in the accompanying drawings, the dockboard 10 is shown mounted on a dock D to provide a ramp between the top T of the dock D and the platform P of an adjacent vehicle V. The dockboard 10 consists of a dock plate 12, a lip plate 14, a hinge connection 16 connecting the lip plate 14 and dock plate 12, guide means 18 for guiding vertical movement of the dock plate 12, and a framework 20 for supporting the guide means 18 at the vertical face or front F of the dock D.

The dock plate 12 is made of flat heavy steel that is supported in its inoperative position in a flat disposition on the dock top T so that it does not significantly provide any obstruction to cross-traffic activity on the dock top T even though no recess has been provided in the dock top T to accommodate the plate. The dock plate 12 is generally rectangular in shape and has an outer end portion 22 extending generally along an edge E of the dock D and an inner end portion 24 supported freely on the dock top T inwardly of the dock edge E.

The guide means 18 is located below and pivotally connected to the dock plate outer end portion 22 and functions to guide movement thereof in a substantially vertical path above the dock top T while allowing pivoting of the dock plate 12 thereat so that the inner end portion 24 will remain supported on and will slide along the dock top T during vertical movement of the dock plate outer end portion 22. The guide means 18 includes a pair of vertically movable guide bars 26 connected at their upper ends to the opposite sides of the dock plate outer end portion 2. These guide bars 26 ride freely for vertical movement in a pair of vertically extending retaining channels 28, which are provided with facing vertical slots 30 that allow extension therethrough of a horizontal cross-member 32 that interconnects the guide bars 26 for cooperative vertical movement in guiding vertical movement of the dock plate 12.

The guide bars 26 are connected to the dock plate outer end portion 22 through a hinge pin 34 that has its ends 36 seated in upwardly facing slots 38 in the upper ends of the guide bars 26. The ends 36 of the hinge pin 34 are retained in the slots 38 by retaining blocks 40 that are attached by screws 42 to the outer faces of the guide bars 26 above the hinge pin ends 36 and having downwardly facing recesses engaging over the hinge pin ends 36. The hinge pin 34 is retained in position horizontally by cotter pins 44 extending through the hinge pin ends 36 outwardly of the retaining blocks 40 and separated therefrom by intermediate washers 46. With this arrangement, the hinge pin 34 and guide bars 26 can be easily separated when damaged or when disassembly is desired for any other reason simply by removing the screws 42 and retaining blocks 40.

The hinge pin 34 constitutes a part of the aforementioned hinge connection 16, which also includes a plurality of hinge brackets 48, 50 arranged in a series on the hinge pin 34. Each bracket 48, 50 has a tubular portion 52 surrounding the hinge pin 34 for free pivoting thereon and a flat portion 54 extending tangentially from the tubular portion 52. The flat portions 54 of alternate hinge brackets 48 extend under the outer end portion 22 of the dock plate 12 and are attached as by welding to the underside thereof, and the flat portions 54 of the other hinge brackets 50 extend under the lip plate 14 and are secured as by welding to the underside thereof. Thus, a continuous hinge connection 16 is provided along the extent of the lip plate 14 and dock plate 12 for sturdy and effective load transmission, which is particularly important as the entire load of the dockboard is transmitted through this connection.

As the dock plate 12 and lip plate 14 are attached in the same manner to the hinge brackets 48, 50, they are substantially equally offset radially from the hinge axis, which is the axis of the hinge pin 34. Therefore, their facing edges 56 and 58, respectively, are disposed so that upon upward pivoting of the lip plate 14 about the hinge pin 34 these facing edges 56, 58 will ultimately abut each other and limit further upward hinged pivoting. When this abutment occurs, as when the dockboard 10 is positioned with the lip plate 14 on a vehicle platform P and the dock plate inner end portion 24 supported on the dock top T, the dock plate 12 and lip plate 14 form a continuous load supporting span throughout their combined extent with the load being transmitted through the hinge connection 16 without load application on the guide means 18.

The circumferential relation of the facing edges 56 and 58 of the dock plate 12 and lip plate 14, respectively, is preferably selected to effect a limiting of upward movement of the lip plate 14 when it is slightly less than aligned with the dock plate 14, thereby imposing a slight relative downward angulation that assures contact of the outer edge of the lip plate 14 on the vehicle platform P over the expected range of vehicle platform heights.

The lip plate 14 is allowed by the hinge connection 16 to depend from the dock plate outer end portion 22, thereby hanging vertically along the dock front F behind a cover panel 60 secured to the front of the supporting framework 20. In this way, the lip plate 14 is hidden when it is inoperative and cannot damage or be damaged by vehicles or other objects under normal conditions.

To facilitate sliding of the inner end portion 24 of the dock plate 12 along the dock top T, roller means 62 is mounted on the dock plate inner end portion 24 substantially in the plane thereof and in free rolling engagement with the dock top T. This roller means 62 comprises a plurality of independent roller sections in the form of tubular sleeves 64. Each of these tubular sleeves 64 is mounted for free rotation on a common shaft 66, which extends parallel to and is mounted on the end of the outer end portion 22 of the dock plate 12. This shaft 66 is mounted in bracket plates 68 that are secured as by welding in slots 70 in the dock plate inner end portion 24, with the outer ones of the bracket plates being welded to the sides of the dock plate 12 rather than in slots. These bracket plates 68 not only serve as supports for the shaft 68, but also serve as spacers for the tubular sleeves 64. The shaft 66 is retained lengthwise in the bracket plate 68 by cotter pins at the opposite ends of the shaft 66. This arrangement of independent tubular sleeves 64 and a plurality of mounting bracket plates 68 provides sturdy support and free rotation of the independent sections, with the diameter of the tubular sleeves 64 being sufficiently large to assure plate supporting engagement of the dock top T although the sleeves are generally in the same plane as the dock plate 12.

The dockboard 10 of the present invention is intended primarily for manual manipulation and to make this practical the mechanism is provided with a counterbalancing system having counterweight means in the form of counterweight blocks 74 applying an upward force to counteract the weight of the dockboard parts otherwise. The force of the counterweight blocks 74 is applied through the aforementioned cross-means 32, which is generally tubular in cross section except near its ends where it is flattened for extension through the retaining channel slots 30 and to accommodate the cages 76 that enclose the counterweight blocks 74 adjacent each guide bar 26 and between the shaft 66 and the dock front F.

To cause the weight of the blocks 74 to apply an upward force to the cross-member 32, a line 78 is provided for each block 74 and has one end 80 connected to the cross-member 32. Each line 78 extends upwardly from the cross-member 32 over one of a pair of pulleys 82 and downwardly to connection of the other end 84 to the associated counterweight block 74. The pulleys 82 are mounted on a common horizontal shaft 86 for rotation therewith and are located between and adjacent the guide bars 32. The shaft 86 is mounted in bearings 88 secured to plate extensions 90 of the supporting framework 20. These bearings 88 mount the shaft 86 for free rotation with the shaft in horizontal disposition above and parallel to the cross-member 32 while being intermediate the cross-member 32 and counterweight blocks 74 so that the line 78 can extend substantially vertically from the pulleys 82 to the cross-member 32 and counterweight block 74 for a substantially vertical application of counterbalancing forces, thereby minimizing the possibility of binding of the guide bars 26 in the retaining channels 28 during manipulation of the dockboard 10. The location of the pulleys 82 on a common shaft 86 also tends to minimize binding of manipulation as it substantially assures simultaneous movement of both guide bars 26. It also reduces to some extent the bearing mountings necessary as compared with the use of separate shafts, and the location of the pulleys 82 inwardly of the guide bars 26 provides a compact overall structure.

The aforementioned cages 76 are spaced from the dock front F a distance slightly greater than the width of the counterweight blocks 74 and cooperate with the dock front F to retain the blocks in position during dockboard manipulation. Each of these cages 76 comprises a pair of vertically extending corner angles 92 spaced parallel to the dock front F a distance generally equivalent to the extent of the counterweight block 74 and extending toward the dock front F sufficiently to retain the blocks against movement parallel to the dock front F. The corner angle 92 adjacent the retaining channels 28 are secured to the exterior of the channels, and struts 94 extend between and are secured to the corner angles 92 to rigidly the cages 76.

The weight of the counterweight block 74 is selected by a determination of the weights and application of forces of the various components of the dockboard 10 so that only a relatively small upward pull need be applied to raise the dockboard, and it will stay in any position that it has been raised to until some external downward force is applied.

The aforementioned components of the counterbalancing system are supported by and enclosed in the aforementioned supporting framework 20, which has horizontal top plates 96 disposed laterally outward of the guide bars 26 and extending over the dock top T to which it is secured by bolts 98. Outer side plates 100 extend downwardly from the top plates 96 and combine therewith to form a mounting for bumper pads 102 that project outwardly of the vertical plane of the cover panel 60 to provide protection for the dockboard when a vehicle is backed into position for unloading at the dockboard 10. Secured to the underside of each top plate 96 is a vertically extending main support channel 104 to which the aforementioned retaining channels 28 and bearing mounting plate extensions 90 are secured. These main support channels 104 extend downwardly to the bottom of the cover panel 60 for supporting attachment of the cover panel thereto. Projecting downwardly from the main support channels 104 are mounting bolts 106 that are threadably adjustable and are padded at their downward ends for contact with the ground or other surface therebelow. Also secured to the main support channels 104 adjacent the bottoms thereof are plate extensions 108 that extend horizontally toward the dock front F and have bolts 110 extending therethrough. These bolts 110 are disposed in slots 112 formed in attaching plates 114 that extend parallel to the plate extensions 108 and have legs 116 parallel with and abutting the dock front F and attached thereto by bolts 118. The bolt and slot connection permits necessary adjustment to assure disposition of the supporting framework 120 so that the retaining channels 128 will be vertical to assure proper vertical movement guiding of the dock plate 12 by the guide means 18.

When the dock board 10 is in its inoperative position, the dock plate 12 lays flat on the dock top T, the lip plate 14 hangs out of sight behind the cover panel 60, and the counterweight blocks 74 are in raised counterbalancing position. To manipulate the dock board 10 into operative position, the dock plate 12 is grasped and raised. This can be done by using a hand hook 120 and engaging it under a loop 122 that is welded to the side of the dock plate 12 at the outer end portion 22 thereof and accommodated in an opening 126 formed in the adjacent top plate 96. Because of the counterbalancing system, one man can easily apply sufficient force to raise the dock plate 12 to any desired height within the operating range of the dockboard 10. When the dock plate 12 has reached a desired height, the counterweight blocks 74 will retain it in this position while the hand hook 120 is used to pivot the lip plate 14 upwardly by engagement of the hand hook 120 in one of the holes 124 provided for this purpose adjacent the outer end of the lip plate 14. With the lip plate 14 held in an upwardly pivoted position, the dockboard 10 can be lowered onto the platform P of an adjacent vehicle V by stepping on or otherwise pushing downwardly on the dock plate 12. When the lip plate 14 contacts the vehicle platform P it will continue to pivot upwardly until its facing edge 58 abuts the facing edge 56 of the dock plate 12, at which time the plates will form a continuous load supporting span from the vehicle platform P to the dock top T so that the vehicle can be loaded or unloaded across the dockboard 10.

When it is desired to return the dockboard to its inoperative position, the dock plate 12 is again raised by use of the hand hook 120 until the lip plate 14 can swing downwardly clear of the vehicle platform P and into its original vertical position in which it will be disposed behind the cover panel 60 upon subsequent lowering of the dock plate 12 by stepping on it or otherwise applying a downward force sufficient to force the dock plate 12 to its position flat on the dock top T.

The ertical movement of the guide bars 26 to move the dock plate outer end portion 22 in a vertical direction assures maintenance of the dockboard in a position for proper disposition on a vehicle platform P regardless of the height to which the dockboard has been raised, and the free support of the dockboard inner end 24 on the dock top T accommodates such vertical movement at the dockboard outer end portion 22 and also eliminates the need for any connecting structure on the dock that would interfere with cross-trafic travel. Furthermore, the flat dock plate 12 in this arrangement can be made of any length so that the dockboard can be raised to a considerable extent without too steep an incline of the dock plate for satisfactory operation.

It is to be understood that the present invention is capable of modification and variation beyond the specific construction described hereinabove and illustrated in the accompanying drawings, which construction is disclosed in detail for purposes of information and not limitation. The present invention is intended to be limited only by the scope of the accompanying claims and equivalents thereof.

I claim:

1. A dockboard for use on a loading dock to provide a ramp between the dock and the platform of an adjacent vehicle, said dockboard comprising a flat dock plate disposed on the top of the dock with an outer end portion extending generally along an edge of the dock and an inner end portion supported freely on the top of the dock inwardly of the dock edge, means mounted on the vertical face of the dock below and pivotally connected to said dock plate outer end portion to guide movement thereof in a substantially vertical path above the top of the dock while allowing pivoting of the dock plate thereat so that said inner end portion of the dock plate will remain supported on and will slide along the top of the dock during vertical movement of the outer end portion, and a lip plate hingedly depending from said dock plate outer end portion along a horizontal hinge axis for hinged pivoting of said lip plate therealong with respect to said dock plate outer end portion with the upward hinged pivoting being limited to cause said dock plate and lip plate to form a continuous load supporting span throughout their combined extent from a vehicle platform to the dock top, said dockboard being movable from an inoperative position wherein the dock plate is flat on the dock top and the lip plate hangs vertically downward along said vertical face of the dock to an operative position at which the outer end portion of the dock plate has been raised vertically with the inner end portion remaining supported on the dock top, the lip plate have been pivoted upwardly above the platform of an adjacent vehicle and the dockboard then lowered with the inner end portion remaining supported on the dock top to dispose the lip plate on the vehicle platform with the lip plate pivoted upwardly to the limit of upward pivoting, whereby said lip plate and dock plate provide the aforesaid continuous load supporting span.

2. A dockboard according to claim 1 and characterized further in that upward hinged pivoting of said lip plate is obstructed by said dock plate to limit said upward hinged pivoting.

3. A dockboard according to claim 1 and characterized further in that said lip plate is mounted for upward hinged pivoting into edge abutment against said dock plate, said edge abutment limiting said upward hinged pivoting to provide the aforesaid load supporting span.

4. A dockboard according to claim 1 and characterized further by a hinge connection between said guide means and said dock plate, said hinge connection having a pin secured to said guide means and extending coaxially with said horizontal hinge axis, and a plurality of hinge brackets mounted on said pin for free pivoting thereon with alternate brackets secured to said dock plate and the other brackets secured to said lip plate, said dock plate and said lip plate being substantially equally offset radially from said hinge axis and having facing edges disposed for abutment to limit upward hinged pivoting.

5. A dockboard according to claim 1 and characterized further by roller means mounted on said inner end portion of said dock plate substantially in the plane thereof and in free rolling engagement with the dock top to facilitate sliding of the dock plate inner end portion therealong.

6. A dockboard according to claim 5 and characterized further in that said roller means comprises a plurality of independent roller sections extending along the end of said inner end portion.

7. A dockboard according to claim 1 and characterized further in that said guide means comprises a pair of vertically movable guide bars connected to said dock plate, a horizontal cross-member extending between and connecting said guide bars, a horizontal shaft mounted for rotation above and parallel to said cross-member, a pair of pulleys mounted on said shaft for rotation therewith between and adjacent said guide bars, a line trained over each of said pulleys and having one end connected to said cross-member, counterweight means connected to the other end of said line for counterbalancing said dock plate and guide means sufficiently to permit manual manipulation of said dock plate.

* * * * *

PO-1050
(5/69)

UNITED STATES PATENT OFFICE
CERTIFICATE OF CORRECTION

Patent No. 3,840,930                     Dated October 15, 1974

Inventor(s) Robert E. Waddell

It is certified that error appears in the above-identified patent and that said Letters Patent are hereby corrected as shown below:

On the abstract page, the name of the inventor should be -- Waddell --; Column 3, line 7, "terante" should read -- ternate --; Column 3, line 16, before "of," delete "plate" and insert therefor -- plane --; Column 3, line 42, "shows" should read -- shown --; Column 4, line 28, "2" should read -- 22 --; Column 6, line 51, "rigidly" should read -- rigidify --; Column 7, line 66, "ertical" should read -- vertical --; and Column 8, line 51, "have" should read -- has --.

Signed and sealed this 17th day of December 1974.

(SEAL)
Attest:

McCOY M. GIBSON JR.
Attesting Officer

C. MARSHALL DANN
Commissioner of Patents